April 8, 1958 K. H. WILSON Re. 24,454
FOLDING SECTIONAL TABLE
Original Filed Dec. 14, 1954 3 Sheets-Sheet 1
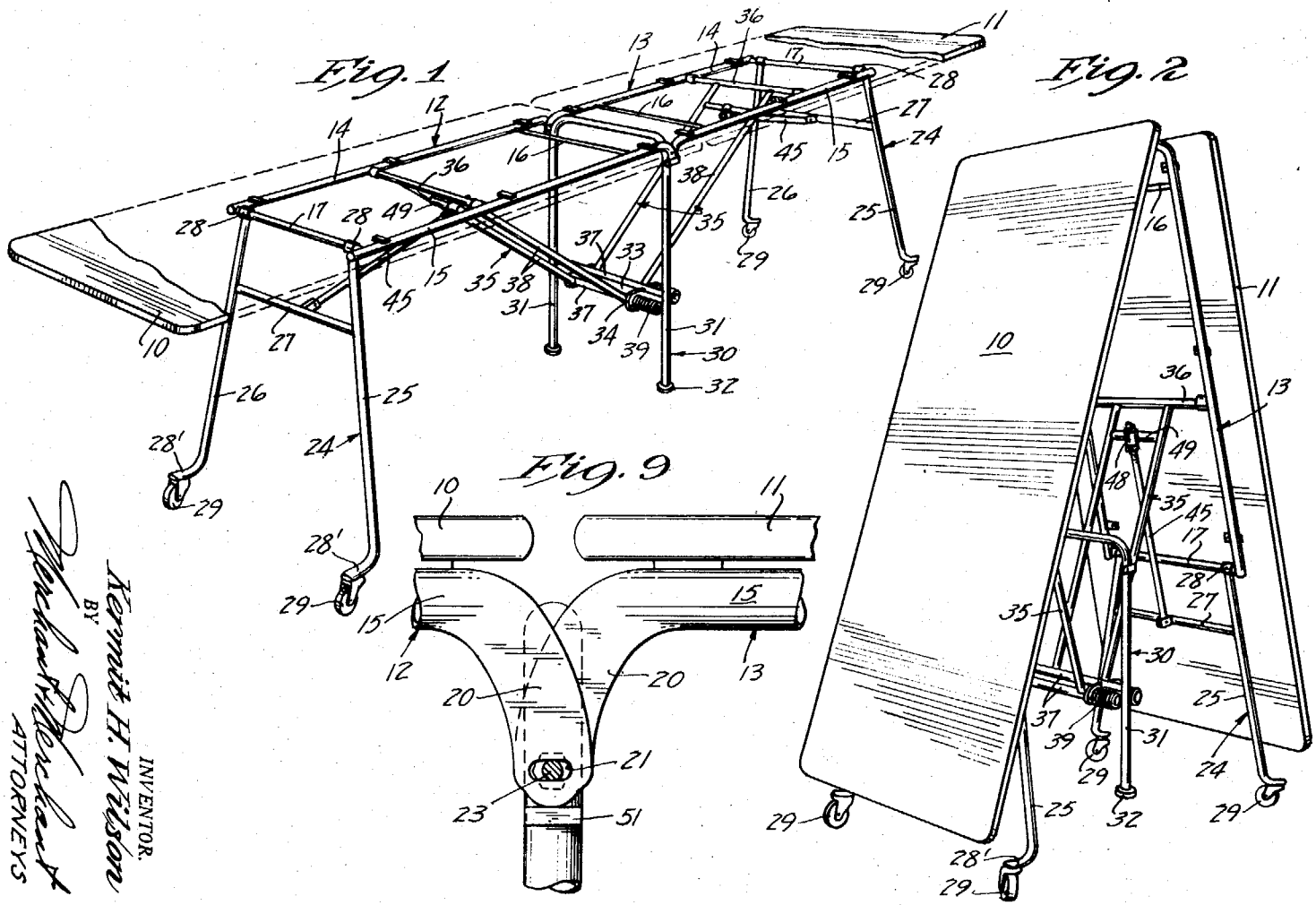
INVENTOR.
Kermit H. Wilson
BY
Merchant & Merchant
ATTORNEYS

FOLDING SECTIONAL TABLE

Original Filed Dec. 14, 1954 3 Sheets-Sheet 2

INVENTOR.
Kermit H. Wilson
BY
Merchant & Merchant
ATTORNEYS

FOLDING SECTIONAL TABLE

Original Filed Dec. 14, 1954 3 Sheets-Sheet 3

INVENTOR.
Kermit H. Wilson
BY
Merchant & Merchant
ATTORNEYS

United States Patent Office

Re. 24,454
Reissued Apr. 8, 1958

24,454

FOLDING SECTIONAL TABLE

Kermit H. Wilson, Minneapolis, Minn.

Original No. 2,747,958, dated May 29, 1956, Serial No. 475,214, December 14, 1954. Application for reissue March 28, 1957, Serial No. 649,268

17 Claims. (Cl. 311—92)

Matter enclosed in heavy brackets [ ] appears in the original patent but forms no part of this reissue specification; matter printed in italics indicates the additions made by reissue.

My invention relates to table structures; and, more particularly, it relates to tables which are easily folded and are portable when folded.

An object of my invention is to provide a novel and improved table which is easily folded for storage, and when folded, occupies a minimum of space.

Another object of my invention is to provide a novel and improved portable folding table which, when unfolded to operative position, will resist moving about, and when folded, is easily portable.

Another object of my invention is to provide a novel and improved portable folding table having intermediate leg structure which is movable vertically upwardly during the folding of the table from its operative generally horizontal position to its inoperative folded position, and the lower floor-engaging end of the intermediate structure is disposed in upwardly spaced relationship but is adjacent to the floor at the inoperative folded position of the table.

Another object of my invention is to provide a novel and improved portable folding table having a pair of outer leg structures each comprising a pair of laterally spaced leg members, the lower caster-equipped ends of which are outwardly turned to dispose the casters secured thereto outwardly generally beyond the limits of the table at its inoperative folded position, which insures extreme stability of the table.

A further object of my invention is to provide a novel and improved portable folding table, which is simple and rugged in construction and easily and simply operative.

These and other objects and advantages will be apparent in the course of the following specification and claims, reference being had to the accompanying drawings, wherein:

Fig. 1 is a view in perspective of my invention, with the table top thereof shown in fragment and dotted lines, in its unfolded operative position;

Fig. 2 is a view in perspective of my invention, showing it in partially folded inoperative position;

Fig. 9 is an enlarged fragmentary detail view in side elevation, with some parts broken away and some parts shown in section, of a portion of Fig. 4, showing the pivotal connection between the mounting frames of my invention.

Figure 3:
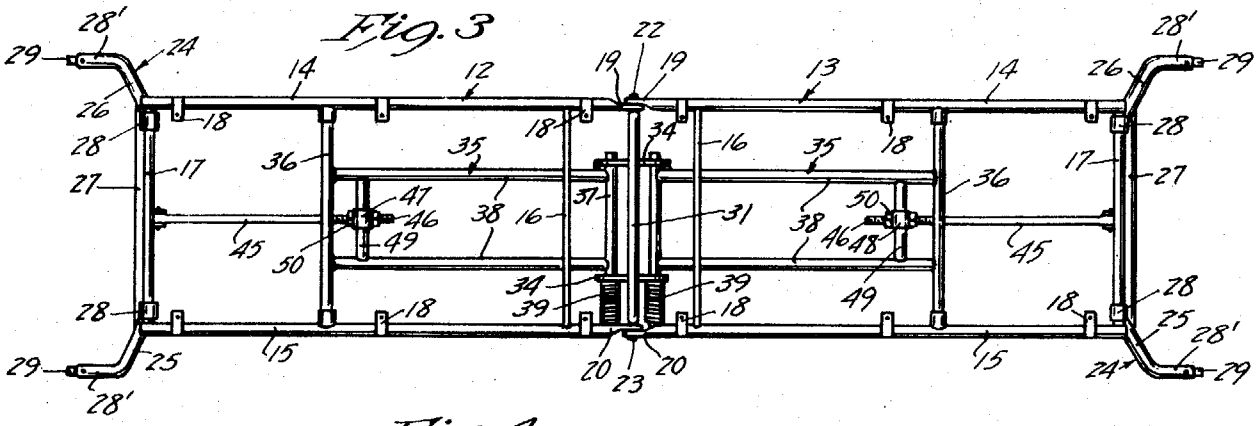
Fig. 3 is a view in top plan of my invention, the table top sections thereof removed, in its unfolded operative position.

Referring more particularly to the drawings, wherein like parts will be indicated by the same numeral, my novel and improved table has a table top comprising a pair of like longitudinally extending generally rectangular table top sections 10 and 11 which may be formed of any suitable material, such as wood, metal or the like, and which are rigidly secured to generally rectangular underlying mounting frames 12 and 13, respectively. Like mounting frames 12 and 13 each comprise a pair of longitudinally extending tubular laterally spaced frame members 14 and 15 and longitudinally spaced parallel inner and outer cross members 16 and 17, which are secured to the frame members 14 and 15 preferably by welding or the like. As shown, top sections 10 and 11 are secured to the mounting frames 12 and 13 by screws or the like extending through the plurality of ears 18 which are anchored, preferably by welding or the like, to the frame members 14 and 15.

Figure 4:
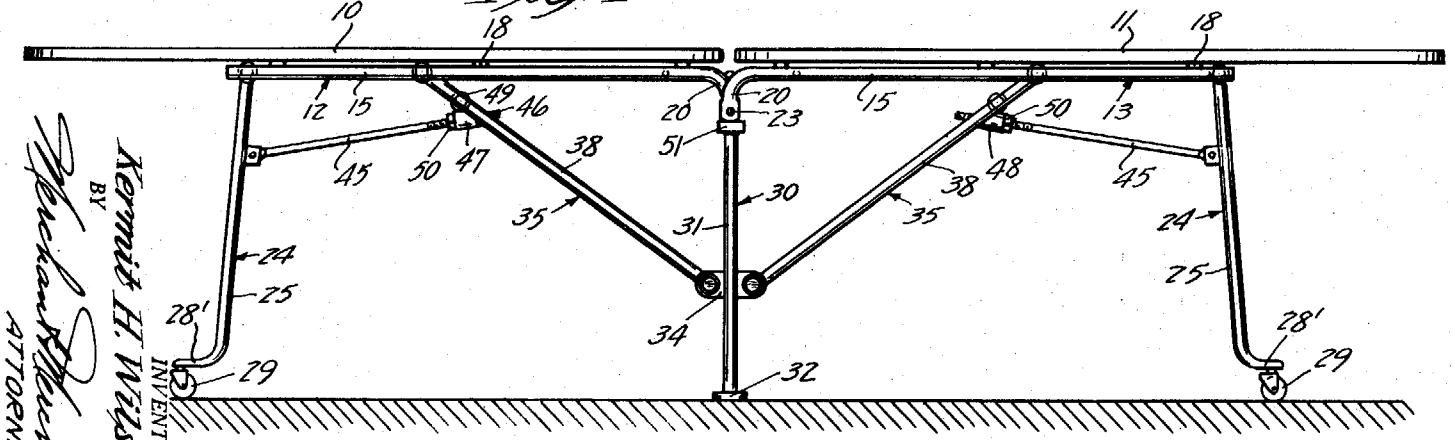
Fig. 4 is a view in side elevation of my invention in its unfolded operative position.
Figure 5:
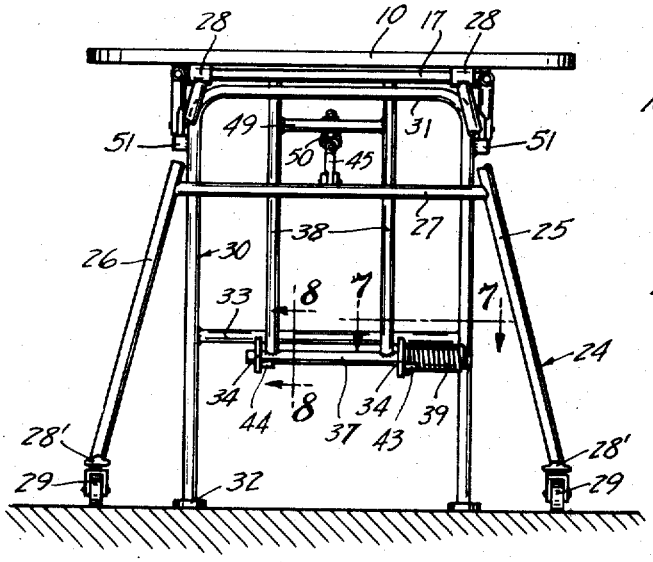
Fig. 5 is a view in end elevation, with some parts broken away, of the structure shown in Fig. 4.
Figure 6:
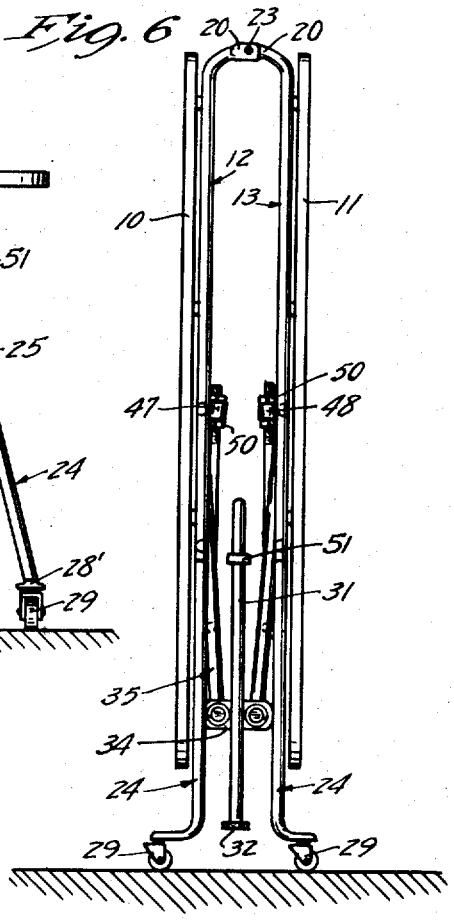
Fig. 6 is a view in end elevation of my invention, in its folded inoperative position.
Figure 7:
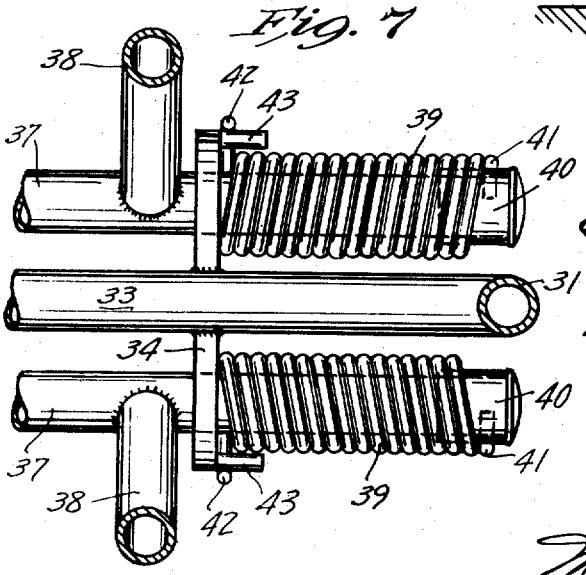
Fig. 7 is an enlarged fragmentary view in horizontal section, taken substantially on the line 7—7 of Fig. 5.

Frame members 14 and 15 of each of the frames 12 and 13 extend beyond cross member 16 and are downturned to define laterally spaced ends 19 and 20, the extremities of which are flattened and have slots or enlarged openings 21 formed therein. Ends 19 of mounting frames 12 and 13 are pivotally connected together by headed pivot pin 22 extending through the slots 21 formed therein and secured by a self-locking nut. Similarly, ends 20 of mounting frames 12 and 13 are pivotally connected by a headed pivot pin 23 axially aligned with pin 22, and which extends through the slots 21 formed in ends 20 and is secured by a self-locking nut. Mounting frames 12 and 13 and table top sections 10 and 11 anchored thereto are supported for pivotal swinging movements on a horizontal axis defined by pivot pins 22 and 23 from operative aligned generally horizontal positions, shown in Figs. 1 and 4 particularly, to inoperative upstanding generally vertical positions, shown in Fig. 6. Table top sections 10 and 11 are anchored to the pivotally connected mounting frames 12 and 13 with their adjacent inner ends in spaced relationship at their operative positions which insures against any accidental catching and injuring of the operator's fingers.

I provide a pair of outer leg structures indicated by the general reference numeral 24; each is pivotally connected to a different one of the table sections 10 and 11 on a horizontal axis spaced from but parallel to the axis defined by pivot pins 22 and 23. Preferably as shown, outer leg structures 24 each comprise a pair of laterally spaced oppositely disposed laterally outwardly diverging leg members 25 and 26 connected by a cross member 27. Legs 25 and 26 and cross member 27 of each of the outer leg structures 24 are preferably made from metal tubing, and the cross member 27 is joined to legs 25 and 26 by welding or the like.

The upper ends of legs 25 and 26 of the outer leg structures 24 are secured by welding or the like to tubular sleeve portions 28 which are mounted for pivotal movement on the cross members 17, whereby the leg structures 24 are pivotally swingable with respect to their cooperating top sections from positions generally parallel thereto to positions generally normal thereto. The lower ends of leg members 25 and 26 of each of the outer leg structures 24 are outwardly turned generally normal to the pivot axis thereof to provide feet 28' each having a caster 29 secured thereto. Casters 29 define the floor-engaging ends of the outer leg structures 24 and are disposed by outwardly turned feet 28' beyond the limits of the table top sections 10 and 11 when the table is in its inoperative generally vertical position shown in Fig. 6. This is a very important feature of my invention, which insures extreme stability of my table when it is in its folded inoperative position.

I provide an intermediate floor-engaging leg structure 30 comprising an inverted U-shaped tubular member 31, the free lower ends of which have rubber floor-engaging feet 32 secured thereto. A horizontally disposed cross member 33 is secured by welding or the like to the depending parallel portions of U-shaped member 31 intermediate the ends thereof. A pair of oppositely disposed bearing brackets 34 is secured by welding or the like to cross member 33 transversely with respect thereto.

I provide a pair of like rigid control arms 35; each is pivotally connected adjacent one end to the intermediate leg structure 30 at a place above the lower floor-engaging feet 32 thereof and each is pivotally anchored to a different one of the table top sections 10 and 11 on a generally horizontal axis intermediate the pivot axis of the leg structure 24 of the same top section and the axis of the pivotal connection between the adjacent ends of the two top sections 10 and 11, as defined by the axially aligned pivot pins 22 and 23. Preferably as shown, each of the control arms 35 comprises parallel shafts 36 and 37 at the opposite ends thereof and a pair of laterally spaced arms 38 extending between shafts 36 and 37, all of which are rigidly secured together by welding or the like. The shaft 36 of one control arm 35 is journalled transversely in the frame members 14 and 15 of mounting frame 12 intermediate cross member 17 of mounting frame 12 and the pivotal connection between mounting frames 12 and 13. The shaft 36 of the other control arm 35 is journalled for pivotal movement in the frame members 14 and 15 of mounting frame 13 intermediate cross member 17 of mounting frame 13 and the pivotal connection between mounting frames 12 and 13. The shafts 37 of control arms 35 are journalled for pivotal movement in bearing brackets 34 in parallel relationship on opposite sides of cross member 33 of the intermediate leg structure 30.

Figure 8:
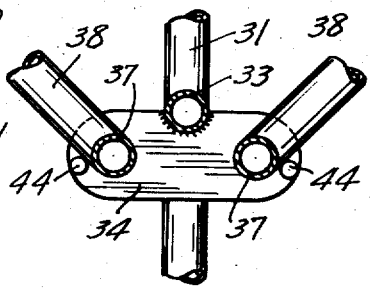
Fig. 8 is an enlarged fragmentary view in vertical section, taken on the line 8—8 of Fig. 5.

Yielding counterbalancing means urging the control arms 35 in a direction to move the table top sections 10 and 11 in their upstanding generally vertical inoperative positions comprises a pair of counterbalancing torsion springs 39 which encompass laterally outwardly extending end portions 40 of the shafts 37 laterally outwardly of the adjacent bearing plate 34. The outer ends of end portions 40 are notched to receive ends 41 of springs 39 and the opposite ends 42 thereof are hooked about pins 43 anchored to the adjacent bearing plate 34. Referring in particular to Fig. 8, the other bearing plate 34, spaced from springs 39, has a pair of stop pins 44 anchored thereto and each is disposed in the path of pivotal movement of one of the arms 38 of a different one of the control arms 35 for a purpose which will be subsequently brought out.

I provide a pair of rigid control links 45; each is pivotally connected to a longitudinal intermediate portion of a different one of the control arms 35 and to a longitudinally intermediate portion of a different one of the outer leg structures 24 to control the pivotal movement of the outer leg structures 24. Specifically, one end of each of the control links 45 is pivotally connected to the cross member 17 of a different one of the outer leg structures 24; and the opposite end 46 of each of the control links 45 is adjustably secured to a pivotal connection comprising transversely disposed sleeves 47 and 48, which are anchored together by welding or the like. Sleeves 48 are each mounted for pivotal movement on one of two cross bars 49, each extending between spaced arms 38 intermediate shafts 36 and 37 and parallel thereto of a different one of the control arms 35. Each of the ends 46 of the control links 45 is threaded and extends through a different one of the sleeves 47 and is adjustably secured therewith by jam-nuts 50 disposed on opposite sides thereof. The position of anchoring sleeve 47 to each end 46 may be adjusted by jam-nuts 50 to adjust the effective length of each link 45 between its pivotal connection with cross bar 49 and cross member 17 of its respective control arm 35 and outer leg structure 24. Control links 45 are somewhat critically positioned with respect to their relationship with the outer leg structures 24 and control arms 35 and their lengths are adjusted to properly control the pivotal movement of outer leg structures 24 with respect to the top sections 10 and 11 so as to maintain the outer leg structures 24 in generally vertical positions at all positions of the table top sections 10 and 11. Control links 45 are positioned so that outer leg structures 24 pivot toward their parallel positions with respect to table top sections 10 and 11, which are reached at the inoperative generally vertical positions of the table top sections, faster than would normally be so if this were the regular generally used parallelogram folding arrangement, which is an additional factor that provides for the greater stability of my invention over table structures now known.

Control arms 35 extend from their pivotal connections at intermediate leg structure 30 to their pivotal connections at their respective mounting frames 12 and 13 to form generally a variable V-shape, the vertex of which is disposed generally coincident with intermediate leg structure 30 and generally vertically aligned with the connection between the adjacent ends of the mounting frames 12 and 13 which provides a very sturdy and rigid support for table top sections 10 and 11 when the latter are in their operative generally horizontal positions. Control arms 35 are swingable inwardly generally about the aforesaid vertex and specifically about the shafts 37 to guide and support the movement of the top sections 10 and 11 from their operative positions to their inoperative positions, and are swingable outwardly generally about the aforesaid vertex to guide and support the movement of the top sections 10 and 11 from their inoperative positions to their operative positions.

The movement of the top sections 10 and 11 from their operative positions to their inoperative positions is effected by an operator who grasps the top sections adjacent their inner pivotally connected ends, each with one hand, pulls up, and then positions the top sections together until the folding action is completed. The movement of each top section 10 or 11 from its operative to its inoperative position is a rotational or angular movement generally about the pivot axis of its respective leg structure 24 and at the same time the aforesaid pivot axis moves horizontally inwardly. The generally upward and inward arcuate movement of shafts 36 of the control arms 35 follows an elliptical curve and the vertex formed by control arms 35 is moved generally vertically upwardly and downwardly during the movement of top sections 10 and 11 from their operative to their inoperative positions. Intermediate leg structure 30 disposed generally at the aforesaid vertex is moved vertically therewith during the movement of the top sections 10 and 11 from their operative to their inoperative positions. The length of each control arm 35 plus the distance between its pivotal connection to the intermediate leg structure 30 and the lower end thereof, defined by the distance between cross member 33 and the extremities of feet 32, is less than the distance between that control arm's connection to the frame members 14 and 15 and the cross member 17 secured to the same frame members plus the distance between the aforesaid cross member 17 and the casters 29 of that outer leg structure 24 which is connected to the same aforesaid cross member 17, so that intermediate leg structure 30 carried by the control arms 35 reaches a limit of vertically upward movement and then is moved vertically downwardly a distance less than the distance of its upward movement during the movement of the top sections 10 and 11 from their operative positions to their inoperative positions. Thus, at the inoperative positions of the top sections 10 and 11, feet 32 of intermediate leg structure 30 are disposed in upwardly spaced relationship with respect to the floor.

Rubber floor-engaging feet 32 frictionally engage the floor at the operative positions of table top sections 10 and 11 to prevent any sliding movement of the table when it is set up in its operative position; however, when table top sections 10 and 11 are in their inoperative positions, floor-engaging feet 32 are raised upwardly from the floor and the caster-equipped outer leg structures 24 provide my novel and improved table to be easily portable, wherein it may be quickly and easily moved to a suitable storage position where it occupies a minimum of space.

The intermediate leg structure 30 carried by control arms 35 is maintained by control arms 35 and counterbalancing springs 39 generally vertically disposed and in alignment with the pivotal connection between mounting frames 12 and 13. As there may be a slight tipping of the intermediate leg structure 30 during the folding and unfolding of my table between its operative and inoperative positions, I have provided the aforementioned stop pins 44 which are engaged by the control arms 35 during the movement of the table top sections 10 and 11 from their inoperative to their operative positions prior to the engagement of feet 32 of intermediate leg structure 30 with the floor, which is adapted to center the intermediate leg structure 30 and insures that it is properly vertically positioned when the feet 32 thereof engage the floor.

A pair of oppositely disposed abutments 51 is anchored to the intermediate leg structure 30 adjacent the upper end thereof in vertically upwardly spaced relationship with cross member 33. Each of the abutments 51 project laterally outwardly from a different one of the parallel spaced portions of U-shaped member 31; one of the abutments 51 is adapted to be engaged by the pivotally connected ends 19 of mounting frames 12 and 13 and the other is adapted to be engaged by the pivotally connected ends 20 of mounting frames 12 and 13 at the operative positions of table top sections 10 and 11 to limit the downward movement of top sections 10 and 11 and to aid in the support thereof at their operative positions.

Referring in particular to Fig. 9, ends 20 of mounting frames 12 and 13 are connected for pivotal movement by pin 23 as previously explained; in further explanation, pivot pin 23 is loosely journalled in the slots or enlarged openings 21 formed in ends 20 and, similarly, pivot pin 22 is loosely journalled in the slots or enlarged openings 21 formed in ends 19 of mounting frames 12 and 13 to permit limited relative extending and contracting longitudinal movements of ends 19 and 20; and thereby to permit a limited relative extending and contracting longitudinal movement between mounting frames 12 and 13 when the top sections 10 and 11 are approximately in their horizontally aligned operative positions. This provision for a limited relative extending or contracting longitudinal movement between mounting frames 12 and 13 provides some flexibility in an otherwise rigid support for table top sections 10 and 11, at their operative positions, whereby intermediate leg structure 30 may be raised or lowered slightly within the limits permitted by slots 21 with respect to the outer leg structures 24 to insure that feet 32 will frictionally engage the floor even though the floor may not be even. Thus, a slight elevation or depression in the floor beneath the intermediate leg structure 30 is compensated for by a slight upward or downward movement, respectively, of leg structure 30, which compensating movement is effected by the relative overlapping or separation of ends 19 and 20 permitted by slots or enlarged openings 21.

My invention has been built and tested and found to accomplish all of the aforementioned objectives and advantages. It will be obvious to those skilled in the art that my invention may be modified by many substitutions and equivalents and that this disclosure is intended to be illustrative only; therefore, I intend to be limited solely by the scope of the appended claims.

What I claim is:

1. In a portable folding table, a pair of table top sections having adjacent ends pivotally connected for relative swinging movements from operative aligned generally horizontal positions to inoperative upstanding positions, a pair of outer leg structures each pivotally connected to a different one of the table top sections, an intermediate floor-engaging leg structure, a pair of like rigid control arms each pivotally connected to said intermediate leg structure and pivotally anchored to a different one of the table top sections intermediate the pivotal connection of the outer leg structure of that respective table top section and the pivotal connection between the adjacent ends of the two table top sections, and a pair of rigid control links each pivotally connected to the longitudinal intermediate portion of a different one of said control arms and to a longitudinally intermediate portion of a different one of said outer leg structures to maintain the outer leg structures in generally vertical positions at all positions of [tthe] *the* table top sections.

2. The structure defined in claim 1 in which the pivotal connection between said table top sections comprises a pair of axially aligned loosely journalled pivot pins to permit limited relative extending and contracting longitudinal movements of said pivotally connected table top sections.

3. The structure defined in claim 1 in which said intermediate leg structure is generally vertically disposed in alignment with the pivotal connection between the adjacent ends of the two table top sections at all positions thereof.

4. The structure defined in claim 3 in which said intermediate leg structure extends upwardly above the pivotal connection of said control arms thereto, and in further combination with a pair of oppositely disposed abutments anchored to said intermediate leg structure adjacent the upper end thereof to limit the downward movement and to aid in the support of the table top sections.

5. The structure defined in claim 1 in further combination with yielding counterbalancing means urging said control arms in a direction to move said table top sections to the inoperative upstanding positions thereof.

6. In a portable folding table, a pair of longitudinally extending table top sections having adjacent ends pivotally connected for relative swinging movements from operative aligned generally horizontal positions to inoperative folded generally vertical positions, a pair of outer leg structures each pivotally connected to a different one of the table top sections, an intermediate floor-engaging leg structure generally vertically disposed in alignment with the pivotal connection between the adjacent ends of the two table top sections at all positions of said table top sections, a pair of like rigid control arms each pivotally connected to said intermediate leg structure and pivotally connected to a different one of the table top sections intermediate the pivotal connection of the leg structure of that respective table top section and the pivotal connection between the adjacent ends of the two table top sections, and a pair of rigid control links each pivotally connected to the longitudinal intermediate portion of a different one of said control arms and to a longitudinally intermediate portion of a different one of said outer leg structures to maintain the outer leg structures in generally vertical positions at all positions of the table top sections, the length of each control arm plus the distance between the pivotal connection thereof to the intermediate leg structure and the lower end of said intermediate leg structure being so related to the distance between [the] *its* connection to the associated table top section and the pivotal connection of the outer leg structure connected to the same table top section plus the distance between said last-mentioned pivotal connection and the free floor-engaging end of said last-mentioned outer leg structure that at the inoperative positions of said table top sections the vertical distance between a horizontal plane through the pivotal connection of each control arm to the associated table top section and the lower end of said intermediate leg structure is less than the distance between said horizontal plane and a floor supporting said table; whereby, at the inoperative positions of said table top sections the lower floor-engaging end of the intermediate leg structure is disposed in upwardly spaced relationship with respect to a floor.

7. The structure defined in claim 6 wherein the lower floor-engaging end of said intermediate leg structure frictionally engages a floor at the operative positions of said table top sections for preventing movement of the table in the operative position thereof, and each outer leg structure comprises a pair of laterally spaced oppositely disposed inter-connected anti-friction equipped leg members; whereby, when said table top sections are disposed in the inoperative positions said intermediate leg structure is raised off a floor and the anti-friction equipped outer leg structures provide the table to be easily portable.

8. The structure defined in claim 6, wherein said outer leg structures each comprise a pair of laterally spaced oppositely disposed interconnected leg members having the lower ends thereof outwardly turned to dispose the lower ends outwardly beyond the limits of said table top sections when said sections are in the inoperative folded positions thereof.

9. The structure defined in claim 6 in further combination with a bearing bracket anchored to said intermediate leg structure, and the pivotal connection between said control arms and said intermediate leg structure comprises parallel shafts mounted in said bracket for pivotal movements and disposed on opposite sides of said intermediate leg structure generally parallel thereto, and a pair of counterbalancing torsion springs one carried by each of said shafts urging said control arms in a direction to move said table top sections to the inoperative folded generally vertical positions thereof.

10. The structure defined in claim 9 in further combination with a pair of stop pins anchored to said bracket and disposed thereon each within the path of pivotal movement of a different one of said control arms, said control arms engaging said stop pins when moved generally outwardly and downwardly by the movement of said table top sections from their inoperative positions to their operative positions prior to the engagement of said intermediate leg structure with a floor, the engagement of said control arms with said stop pins centering said intermediate leg structure to insure that said intermediate leg structure is properly vertically positioned when it engages a floor.

11. In a portable folding table, a pair of mounting frames each comprising a pair of longitudinally extending laterally spaced rigid frame members, the frame members of one mounting frame having laterally spaced ends pivotally connected to adjacent laterally spaced ends of the frame members of the other mounting frame for relative swinging movements on a horizontal axis, said pivotal connection between said mounting frames comprising a pair of axially aligned pivot pins each extending through one of the frame members of both mounting frames and loosely journalled therein, a pair of longitudinally extending table top sections each anchored to a different one of said mounting frames for swinging movements therewith, said top sections being movable between operative aligned generally horizontal positions to inoperative generally vertical positions and being anchored to said mounting frames to dispose their adjacent inner ends in spaced relationship at the operative positions thereof, a pair of outer leg structures each pivotally connected to a different one of said mounting frames, said outer leg structure each comprising a pair of laterally spaced oppositely disposed interconnected leg members, an intermediate floor-engaging leg structure generally vertically disposed in alignment with the pivotal connection between the adjacent ends of said mounting frames at all positions of said table top sections, a pair of like rigid control arms each pivotally connected adjacent one end to said intermediate leg structure and each being pivotally connected to a different one of said mounting frames intermediate the pivotal connection of the outer leg structure connected to that respective mounting frame and the pivotal connection between the adjacent ends of the two mounting frames, a pair of rigid control links each pivotally connected to the longitudinal intermediate portion of a different one of said control arms and to a longitudinally intermediate portion of a different one of said outer leg structures, and counterbalancing spring means urging said control arms in a direction to move said mounting frames to position said table top sections in the inoperative generally vertical positions thereof.

12. The structure defined in claim 11 wherein the length of each control arm plus the distance between the pivotal connection thereof to the intermediate leg structure and the lower end of said intermediate leg structure being so related to the distance between [the] *its* connection to the associated mounting frame and the pivotal connection of the outer leg structure connected to the same mounting frame plus the distance between said last-mentioned pivotal connection and the free floor-engaging end of said last-mentioned outer leg structure that at the inoperative positions of said table top sections the vertical distance between a horizontal plane through the pivotal connection of each control arm to the associated mounting frame and the lower end of said intermediate leg structure is less than the distance between said horizontal plane and a floor supporting said table; whereby, at the inoperative positions of said table top sections the lower floor-engaging end of the intermediate leg structure is disposed in upwardly spaced relationship with respect to a floor.

13. The structure defined in claim 12 wherein the lower floor-engaging end of said intermediate leg structure frictionally engages a floor at the operative positions of said table top sections for preventing movement of the table in the operative position thereof, and each outer leg structure comprises a pair of laterally spaced oppositely disposed inter-connected anti-friction equipped leg members; whereby, when said table top sections are disposed in the inoperative positions said intermediate leg structure is raised off a floor and the anti-friction equipped outer leg structures provide the table to be easily portable.

*14. In a portable folding table, a pair of table top sections having adjacent ends pivotally connected for relative swinging movements from operative aligned generally horizontal positions to inoperative upstanding positions, a pair of outer leg structures each pivotally connected to a different one of the table top sections intermediate the outer free end of its associated top sections and the pivotal connection between said top sections, a pair of like rigid control arms each pivotally connected adjacent an upper end thereof to a different one of said table top sections intermediate the pivotal connection of the outer leg structure of that respective table top section and the pivotal connection between said table top sections, means pivotally connecting the lower ends of said control arms for relative pivotal swinging movements thereof, said control arms forming generally a variable V-shape with the lower ends of said control arms being disposed generally downwardly spaced from the pivotal connection between said top sections, a pair of rigid control links each pivotally connected to a longitudinal intermediate portion of a different one of said control arms and to a longitudinally intermediate portion of a different one of said outer leg structures to maintain the outer leg structures in generally vertical positions at all positions of the table top sections, and a floor engageable portion associated with the pivotally connected ends of said control arms.*

*15. In a portable folding table, a pair of table top sections having adjacent ends pivotally connected for relative swinging movements from operative aligned generally horizontal positions to inoperative upstanding positions, a pair of outer leg structures each pivotally connected to a different one of the table top sections intermediate the outer free end of its associated top section and the pivotal connection between said top sections, a pair of like rigid control arms each pivotally connected adjacent an upper end thereof to a different one of said table top sections intermediate the pivotal connection of the outer leg structure of that respective table top section and the pivotal connection between said table top sections, means pivotally connecting the lower ends of said control arms for relative pivotal swinging movements thereof, said control arms forming generally a variable V-shape with the lower ends of said control arms being disposed generally downwardly spaced from the pivotal connection between said top sections, a pair of rigid control links each pivotally connected to a longitudinal intermediate portion of a different one of said control arms and to a longitudinally intermediate portion of a different one of said outer leg structures to maintain the outer leg structures in generally vertical positions at all positions of the table top sections, and intermediate leg means supporting the pivotally connected ends of said table top sections at the operative positions of said top sections.*

*16. In a portable folding table, a pair of table top sections having adjacent ends pivotally connected for relative swinging movements from operative aligned generally horizontal positions to inoperative upstanding positions, a pair of outer leg structures each pivotally connected to a different one of the table top sections intermediate the outer free end of its associated top section and the pivotal connection between said top sections, a pair of like rigid control arms each pivotally connected adjacent an upper end thereof to a different one of said table top sections intermediate the pivotal connection of the outer leg structure of that respective table top section and the pivotal connection between said table top sections, means pivotally connecting the other ends of said control arms for relative pivotal swinging movements thereof, the pivotally connected other ends of said control arms being disposed generally downwardly from the pivotal connection between said top sections, and a pair of rigid control links each pivotally connected to a longitudinal intermediate portion of a different one of said control arms and to a longitudinal intermediate portion of a different one of said outer leg structures to maintain the outer leg structures in generally vertical positions at all positions of the table top sections.*

*17. The structure defined in claim 16 in which said means pivotally connecting the other ends of said control arms includes a floor-engaging portion for supporting the pivotally connected ends of the table top sections at the operative positions thereof.*

References Cited in the file of this patent or the original patent

UNITED STATES PATENTS

| | | |
|---|---|---|
| 158,336 | Tiemann | Dec. 29, 1874 |
| 586,112 | Beloin | July 13, 1897 |
| 1,062,996 | Sornberger | May 27, 1918 |
| 2,257,522 | Bailey | Sept. 30, 1941 |
| 2,544,228 | Hoppe | Mar. 6, 1951 |
| 2,544,229 | Hoppe | Mar. 6, 1951 |
| 2,596,986 | Curtis | May 20, 1952 |
| 2,650,146 | Mugler | Aug. 25, 1953 |
| 2,721,778 | Wilson | Oct. 25, 1955 |
| 2,764,460 | Nelson | Sept. 25, 1956 |